(No Model.) 5 Sheets—Sheet 1.

R. SMITH & G. H. COLLINS.
STEAM ENGINE FOR RECIPROCATING PROPELLERS.

No. 327,335. Patented Sept. 29, 1885.

Witnesses.
A. F. Hayden
H. E. Lodge

Inventors.
R. Smith and G. H. Collins.
F. Curtis, Atty.

(No Model.) 5 Sheets—Sheet 3.

R. SMITH & G. H. COLLINS.
STEAM ENGINE FOR RECIPROCATING PROPELLERS.

No. 327,335. Patented Sept. 29, 1885.

enlarged.

Witnesses.
A. F. Hayden.
H. E. Lodge.

Fig. 13.

Fig. 14. Inventors.
R. Smith and G. H. Collins.
F. Curtis, Atty.

N. PETERS, Photo-Lithographer, Washington, D. C.

(No Model.) 5 Sheets—Sheet 4.

R. SMITH & G. H. COLLINS.
STEAM ENGINE FOR RECIPROCATING PROPELLERS.

No. 327,335. Patented Sept. 29, 1885.

Witnesses.
A. F. Hayden.
H. E. Lodge.

Inventors.
R. Smith and G. H. Collins.
F. Curtis, Atty.

UNITED STATES PATENT OFFICE.

RICHARD SMITH, OF SHERBROOKE, QUEBEC, CANADA, AND GEORGE HENRY COLLINS, OF BOSTON, MASSACHUSETTS; SAID COLLINS ASSIGNOR TO SAID SMITH.

STEAM-ENGINE FOR RECIPROCATING PROPELLERS.

SPECIFICATION forming part of Letters Patent No. 327,335, dated September 29, 1885.

Application filed December 6, 1884. (No model.)

*To all whom it may concern:*

Be it known that we, RICHARD SMITH, a citizen of the Dominion of Canada, residing in Sherbrooke, in the county of Sherbrooke, Province of Quebec, Canada, and GEORGE HENRY COLLINS, a citizen the United States, residing at Boston, in the county of Suffolk and State of Massachusetts, have invented certain new and useful Improvements in Steam-Engines for Reciprocating Propellers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention may be considered in the light of an improvement in the mechanism for operating a class of propellers, shown and described in Letters Patent of the United States issued on the 7th day of June, 1881, No. 242,567, in which one or more folding blades or vanes expanding when drawn in one direction propel the vessel, and which fold just prior to and during the return-stroke, offering no resistance to the progress of the vessel. Said vanes are hinged at their bases on pintles to the outer end of the propeller-shaft, which in turn is secured to the outer end of the piston-rod of a steam-cylinder, the edges of the blades or vanes being pivoted by suitable connecting-links to the end of a second piston-rod independent of but co-operating with the first.

The essential object in our present invention is to simplify the mechanism for operating the blades by dispensing with the auxiliary cylinder heretofore employed in actuating the second piston-rod, more fully shown and described in Letters Patent of the United States No. 264,903, issued on September 26, 1882, which is connected to the edges of the blades, and consists in the arrangement of two pistons within one cylinder, the disposition of the various ports and valves being such that one cylinder effects the same result and performs the same functions previously derived by the employment of two cylinders.

Briefly stated, the cylinder is furnished with two supply-ports and a single exhaust-port at each end, and the position of the valves and ports are such (the two pistons when closed upon each other being maintained a slight distance apart) that at the commencement of an active stroke steam is first admitted between the two pistons, which advances one toward the stern of the vessel and opens the blades of the propeller when the valve is closed and the steam between the two confined. Steam is then admitted between the head of the cylinder and the hitherto inactive piston, when both pistons advance bodily rearward, and the active outward thrust of the propeller is effected.

The closing of the blades is effected by allowing the steam between the two pistons to exhaust, and the secondary piston moves toward and resumes its inactive position close to the main piston, thereby closing the propeller-blades, the main piston having reached the end of its stroke and stopped just prior to the exhaust of steam between the two pistons, which permits movement of one toward the other to close the blades. The blades being closed, the propeller is now ready to return, and this is effected by the final movement of the secondary piston as it moves toward the main one, shifting a valve to admit steam at the rear end of the cylinder between the head of the latter and the main piston, and the two pistons, in close proximity, are then returned to the starting-point ready and in position for a second active stroke.

The various minor details which relate to the opening and closing of the ports by the movement of the valves thereon and the operative parts for effecting the same at the proper stated periods dependent upon the position of the pistons within the cylinder and their relation with respect to each other, will hereinafter be more fully described.

The drawings accompanying this specification represent, in Figure 1, a side elevation, and Fig. 2 a similar view, continued from plane 1 2 of a vibrating propeller and operative mechanism embodying our invention. Fig. 3 is a plan, and Fig. 4 an end elevation looking in direction of arrow 1, while Figs. 8 and 9 are elevations of the cam-shafts, while Fig. 10 is a section through the double cam, showing adjustable cut-off, and Fig. 11 is an end view of the same cam. Fig. 12 represents an enlarged side elevation of the G-lever with the spring-actuated trip-toe, while Figs. 13 and 14 are side elevations of the levers.

Figs. 15 to 24, inclusive, are diagrammatic views of the various positions of the pistons and ports during portions of a complete stroke. In these Fig. 15 represents pistons and feed-valves with their ports in position to open blade or active stroke, and Fig. 16 shows the exhaust-port at the same time. Fig. 17 represents the valves, pistons, and adjacent parts in the positions which they occupy when the blade is open, with both pistons ready for active stroke, and Fig. 18 exhaust-valve at the same moments. Fig. 19 represents the active stroke completed preparatory to closing the blade, and Fig. 20 the position of exhaust at that time. Fig. 21 shows the pistons, valves, and adjacent parts in the position which they occupy when the blade is closed, the propeller being ready to retreat inactively, while Fig. 22 shows the exhaust. Figs. 23 and 24 show the various co-operative parts returned to their first positions.

In the above-named drawings, A represents a long bed-plate, upon which is secured a cylinder, B, within which are disposed two pistons, C D, independent of but co-operating one with the other. To these pistons are attached at their inner ends similar rods, $a$ $b$, whose outer extremities are connected to twin cross-heads $c$ $d$, moving in ways or guides $e f$ secured to the base-plate.

Below the bed-plate A, and in axial alignment with the propeller-shaft F, we have disposed a tubular horizontal cross-head, G, which is supported upon and slides in parallel ways or guides $g$. The rear end of this cylinder is attached to the inner end of the propeller-shaft F, which is a hollow rod extending through the hull of the vessel, while its outer extremity is secured to a vertical cross-head or bar, which is guided at top and bottom and plays between horizontal ways or guides secured to the dead-wood of the vessel. The outer or rear end of this shaft F is journaled in a suitable standard, $h$.

To transmit reciprocations from the main piston C to the propeller-shaft F, we have mounted upon the bed-plate A twin standards H, which are spanned by the shaft $i$, to which is attached twin rocker-arms I I, the latter being operated by links $j j$, pivoted at one end to the rocker-arms, at the other to the cross-head $c$. The lower ends of said arms I I are united and attached to the connecting-rods K K, which are pivoted to the rear head of the tubular cross-head G. With the train of mechanism above described reciprocations of the main piston are directly transmitted to the cross-head G and the propeller-shaft, which, as it drives the expanded blades of the propeller rearward, forges the vessel ahead.

In the practical working of the propeller the opening and closing of the blades are effected by and through the aid of a secondary shaft, $k$, inclosed by and working within the propeller-shaft, the outer end of this secondary shaft being linked to the outer edge of the blades, while its inner end is provided with a yoke, $K^2$, playing in the cross-head, in which a slot, $L^2$, is cut of a length sufficient to enable the yoke to move and close or open the blades. Movement of the latter is effected very similarly to that employed in reciprocating the propeller-shaft—that is, we have mounted twin standards H' H', spanned by the rod $i'$, to which are attached the rocker-arms I' I', linked to the cross-head $d$ by means of the bars $j' j'$, while the rod J' secures the ends of the arms I' I' together. Attached to this rod are the connecting-rods K' K', by means of which proper reciprocating motion is transferred from the secondary piston D to the yoke $K^2$, and opening and closing of the blades is effected.

The arrangement of this mechanism as herein adapted provides for the opening and closing of the blades, at which intervals of time one of the pistons is neutral or inactive. Immediately upon the opening or closing of the blades the two pistons C D move together as an integral body.

Proper opening and closing of the feed or supply and the exhaust ports is arranged and provided for by a series of cams, $p\ p'\ p^2$, &c., $s^2\ s^3\ s^4$, &c., arranged upon two horizontal rods, $k\ k'$, located at each end of the cylinder and mounted in bearings formed in twin standards L L, secured to the said cylinder.

Two parallel similarly-mounted lever-rods, $l\ l'$, support G-shaped levers M M' $M^2$, whose free ends $m\ m'\ m^2$ engage with and actuate the valve-stems $n\ n'\ o$ of the feed and exhaust ports, respectively. These levers M M' $M^2$ partially inclose their operative cams $p\ p'\ p^2$, &c., which are secured to the rods $k\ k'$, the latter being actuated in semi-rotary paths of movement by pinions N N', mounted on the ends of said shafts and meshing in a rack, O, moving in guides $q$, secured to or cast upon the side of the standard L.

Centrally of the rack O is a pendent lip with a fixed stud, $r$, embraced by twin-slotted heads $s s'$, which form the extremities of a pair of "side rods," P P', so called, oppositely disposed, the other ends of which are pivoted and secured to the rocker-arms I I'; hence movement of the rocker-arms is conveyed by the side rods, P P', to the rack O, thence to the pinions N N', which impart semi-rotary movement to the cam-shafts and cams $p\ p'\ p^2\ s^2\ s^3$, &c., to operate the G-shaped levers M M' $M^2$, and the valves, by means of the ends $t\ t'\ t^2\ t^3$ of the slots $s\ s'$ in the side rods, P P', striking against the pin $r$, secured to the rack O.

Figure 5:
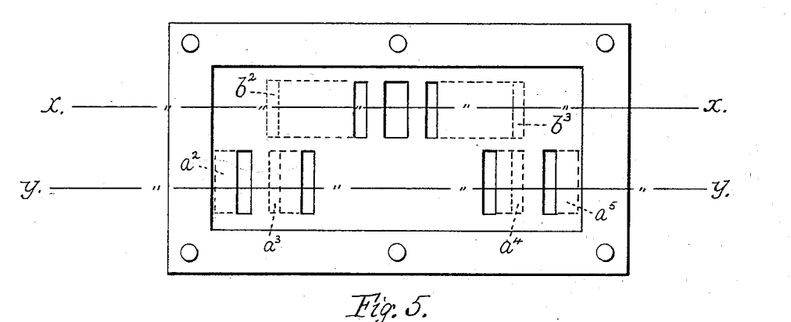
Fig. 5 is a plan of the steam-chest, showing feed and exhaust ports.
Figure 6:
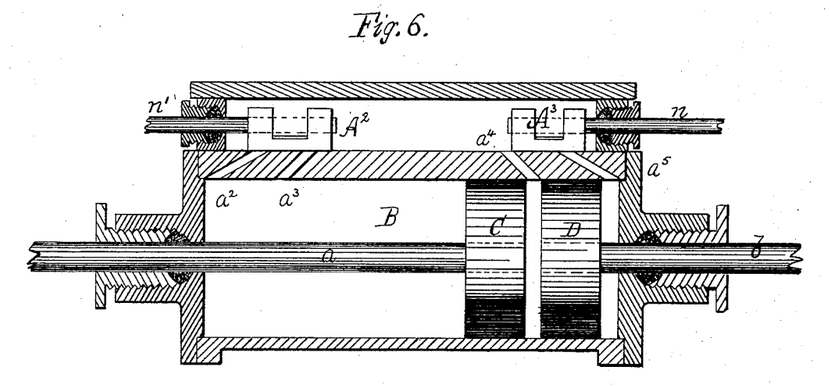
Fig. 6 is a vertical section on line $yy$.
Figure 7:
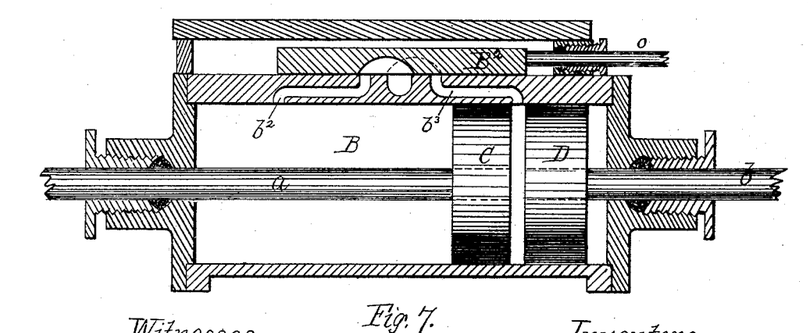
Fig. 7 is a like section on line $xx$.

The general arrangement of the cylinder, with its ports, is shown in Figs. 5, 6, and 7, sections on $y\ y$ and $x\ x$, respectively, in Fig. 5, which is a plan of the steam-chest. In these drawings $a^2\ a^3\ a^4\ a^5$ represent the feed or active ports operated by the two valves $A^2$ $A^3$, for the admission of live steam. To the rear of these (see Fig. 5) are shown the exhaust-ports $b^2\ b^3$ operated by the D slide-valve $B^2$. It will be seen that the exhaust-ports $b^2\ b^3$ are in alignment transversely of the cylinder with the feed-ports $a^3\ a^4$, to permit of escape of steam at times from the entire cylinder, and again only from the space existing between the pistons when at their greatest distance apart, to permit one to close upon the other in the act of folding the blades together. There are no exhaust-ports to correspond to the feed-ports $a^2\ a^5$, in order that the steam contained in the cylinder-space existing from the ports $a^3\ a^4$ and the heads of the cylinder may be prevented from escaping by the passage of the pistons C D over said ports, by which means the steam is compressed and acts as a dash-pot to cushion or overcome the momentum at the end of the stroke in either direction. The valve $A^2$ is operated by the valve-rod $n'$, with which the free end $m'$ of the G-shaped lever M' on the shaft $l'$ engages. Valve $A^3$ is operated by the rod $n$ through the medium of the tail $m$ of the lever M on the shaft $l'$, while the exhaust-valve $B^2$ is operated by the valve-rod $o$ and $m^2$ of lever $M^2$ fixed upon the shaft $l'$.

Having thus shown the general arrangement and disposition of the co-operative parts of our device, we will now proceed to explain the various positions of the valves and their operative mechanism during the different parts of the stroke from the time of the first opening of the blades, preparatory to taking an active stroke, up to the moment of their return in a closed inactive position to the point from which they started. It must be understood that in this invention the feed-ports are always to admit live steam, while separate ports permit of exhaust, as hereinbefore premised.

Cams $p\ p'\ p^2\ p^3$ on the shaft $k'$ work the live steam or feed valves, while $p^4\ p^5\ p^6\ p^7$ on the same shaft effect a change in position of the exhaust-ports. The cams $p\ p'\ s^4\ s^5$ co-operate actively when the vessel is moving forward, and the cams to effect change of the exhaust then actively employed are $s^4\ s^5$ on the shaft $k$. Cams $p\ p'\ p^2\ p^3$ on the shaft $k'$ and $s^2\ s^3\ s^4\ s^5$ on shaft $k$ work the live-steam or feed valves $p\ p'\ s^4\ s^5$ when the vessel is moving forward, while the cams $p^4\ p^5\ p^6\ p^7$ are the ones to operate the exhaust-ports $p^4\ p^5$, being actively employed when the vessel is moving forward, and $p^6\ p^7$ when backing or when the engine is reversed. Further, when the vessel is moving forward the supply-valves employ the cams $p\ p'\ s^4\ s^5$ and co-operate with the exhaust-port cams $p^4\ p^5$ on the reverse, or, when backing, $p^2$ $p^3\ s^2\ s^3$ are employed with the exhaust-port cams $p^6\ p^7$.

In the practical operation of this reciprocating propeller we shall suppose the propeller to be with its blades closed and drawn back in a position for an active stroke ready to propel the vessel forward. The rocker-arms I I' will be at their extremes of movement forward on the right with the tubular cross-head G in a similar position on its guides, while the yoke $K^2$ is at the opposite extreme in the slot in said cylinder or in the same position as when it reaches the end of its stroke in closing the propeller-blades, while the stud or pin $r$, attached to the rack O, rests against the ends $t'\ t^4$ of the slots $s\ s'$, respectively, in the ends of the side bars, P P'. Furthermore, the position of the valve $A^2$ (see Fig. 15) is such as to close both ports $a^2\ a^3$, and has just been moved to such place by the two pistons on their return together, shrugging the rack O forward, which brings the nose of the cam $s^5$ against the upper part of the lever M', and slides the valve in direction of the arrow, while at the opposite end of the cylinder the valve $A^3$ is in position to leave port $a^4$ open and $a^5$ closed, which movement has been effected by the same motion of the pistons which have rotated the shaft $k'$, and with it the double cam $p'$, and brought its long nose against the upper part of the lever M, while the valve has moved in the direction of its arrow.

Figures 15, 16, 17, 18, 19, 20:
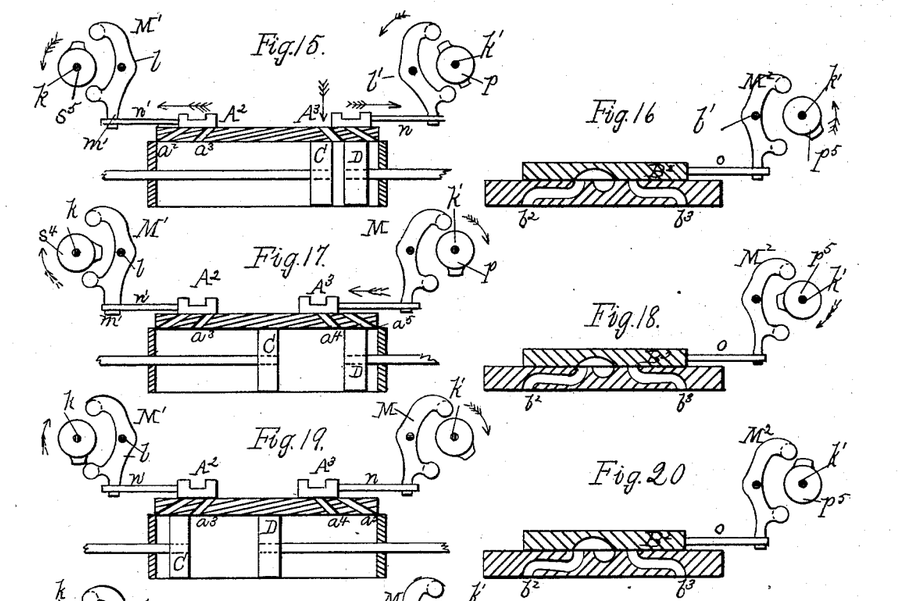

The position of the exhaust-valve $B^2$, Fig. 16, with respect to port $b^2$, is necessarily open to permit of escape of steam, which has just effected return of the two pistons to the position above stated, and as shown in Fig. 15 of the drawings.

The terms "front" and "rear" are used with respect to the bow and stern of the vessel, respectively.

Steam being admitted passes into the steam-chest through the port $a^4$, driving the piston C rearward and away from the other, D, which is then at rest, and so remains for the time. This movement thrusts the inner pivoted portion of the blade back and opens it to its widest extent preparatory to the active stroke. During this movement the tubular cross-head G has likewise moved to the rear by means of the connecting-rod K, rocker-arms I I, and links $j\ j$, which unite them with the ends of the piston-rod $b$ and the yoke $K^2$, and then stands at the front end of the slot $L^2$ in the cross-head G. The motion of the rocker-arms I I rearward has carried the side bar, P, in the same direction by means of the end $t^2$ of the slot $s$, which is in contact with the fixed stud $r$ attached to the rack O. This communicates motion to the latter rearward likewise, and actuates the two pinions N N', which rotate in the direction of arrows, as shown in Fig. 17. The position of parts shown in Fig. 15 represent the movements of the pinions N N' and shafts $k\ k'$ with their cams, as effected by the movement of the two pistons in their retreating stroke, and represents the long lip or cam $p'$, engaging the upper arm of the lever M, to open the port $a^4$, as shown, while the cam $s^4$ has, by contact with lever M′, closed the port $a^2$. The exhaust, on the other hand, is shifted to open $b^2$ and close $b^3$. With the parts in the position in Fig. 15, the movement of the piston C rearward, as hitherto premised, has actuated the pinions N N′. N′ rocks the shaft $k'$, and brings the nose of cam $p'$ against the lower end of the lever M, which thrusts the valve $A^3$ (see Fig. 17) in the direction of its arrow to the rear, closing port $a^4$, and opens the adjacent one, $a^5$, prior to this closed, while the movement of pinion N rotates the shaft $k$ with its cam $s^4$, this latter moving inactively, and the two ports $a^2$ $a^3$ continue closed similarly. Fig. 18 represents the position of the exhaust-port $B^2$, which at that time is unaffected by the cam $p^5$, the latter allowing the lever $M^2$ to remain quiet, and with it the valve. The moment port $a^4$ (after expanding the blade) is closed a volume of steam occupying the space in the cylinder between the two pistons is confined and prevents farther approach of the one with respect to the other, and thus maintains the propeller-blade immovable and at right angles to the keel of the vessel during the outward active thrust of the propeller. Steam now rushes through port $a^5$, and the two pistons C D move bodily to the rear, forcing the propeller-blade against the water, and by this active stroke drives the vessel forward. This movement continues until piston C has reached a position, Fig. 20, to permit of escape of steam through exhaust-port $b^2$, the position of the latter transversely of the cylinder coinciding with feed-port $a^3$; hence when C stops by the escape of steam through $b^2$ it has sufficient momentum to carry it to the end of the cylinder quite up to the mouth of the port $a^2$, and D, with the pressure of live steam upon its front face, rapidly approaches C, and thereby closes the blade. The yoke $K^2$ has now moved the length of the slot $L^2$ in the cross-head G and rests at its rear extremity. The movement of D just prior to reaching the port $a^3$ has brought the end $t^4$ of the slot $s'$ in side bar P′ against the pin $r$, and the rack O has been moved rearward, rotating the pinions N N′ in the opposite direction, which brings (see Fig. 19) the short nose of double cam $p'$ against the upper arm of lever M, and slides the valve $A^3$ across the ports $a^4$ $a^5$, closing them. The same movement of the rack has likewise moved shaft $k$, and the nose of cam $s^4$ wipes against the lever M′, (see Fig. 21,) which thrusts the valve $A^2$ forward and opens the port $a^2$.

It will be understood that the exhaust-port cams are on the same shaft $k'$ as the feed-port cams $p$ $p'$ $p^2$, &c.; hence the movement above described in shifting $A^3$ and closing ports $a^4$ $a^5$ has actuated cams $p^5$ in direction of arrow and caused it to wipe against the upper arm of lever $M^2$, which moves the exhaust-valve $B^2$ forward and closes port $b^2$, while it opens port $b^3$ for escape of steam, which has just effected the movement of piston D in folding the blades.

Figures 21, 22, 23, 24:
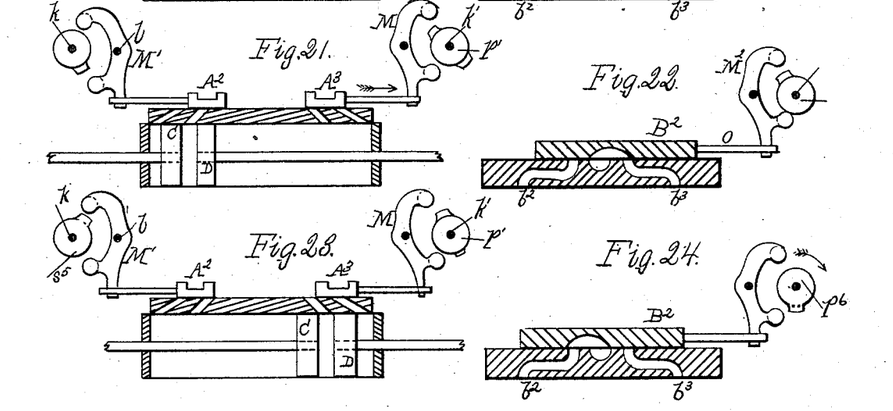

Figs. 21 and 22 represent the position of the ports when steam is admitted through port $a^2$ to the rear of C, and the two pistons move bodily forward. The propeller at this time effects its backward or retreating stroke. Just prior to the end of the return-stroke, $t'$ of slot $s'$ in side bar P has engaged with the pin $r$, attached to the rack O, and the valve $A^2$ closes both ports $a^2$ $a^3$ by the nose of cam $s^5$ wiping against the upper arm of lever M′, while the valve $A^3$ opens port $a^4$ by the action of the long nose of $p'$ wiping against the upper arm of lever M upon shaft $k'$. This movement of $k'$ has actuated cam $p^6$ against the lever-arm of $M^2$, (see Fig. 24,) and shifted exhaust-port $B^2$, closing $b^3$ and opening $b^2$. The ports are now in exactly the same positions just prior to the commencement of an active stroke, and are ready to repeat the same movements.

Figures 1, 2:
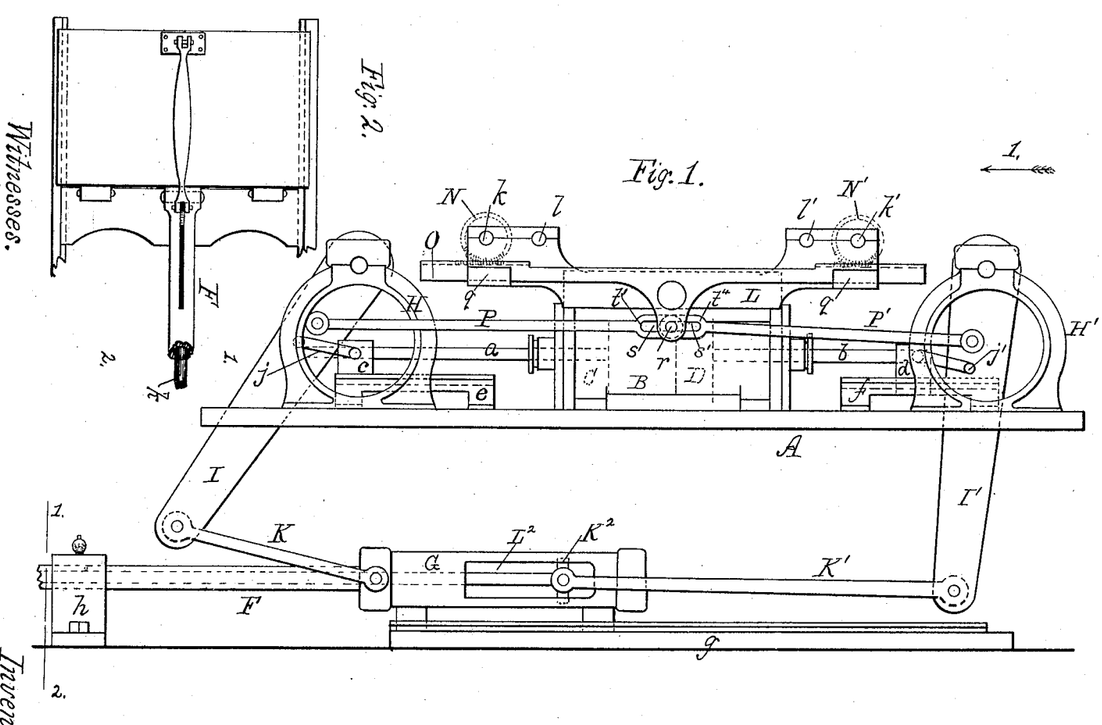
Figure 3:
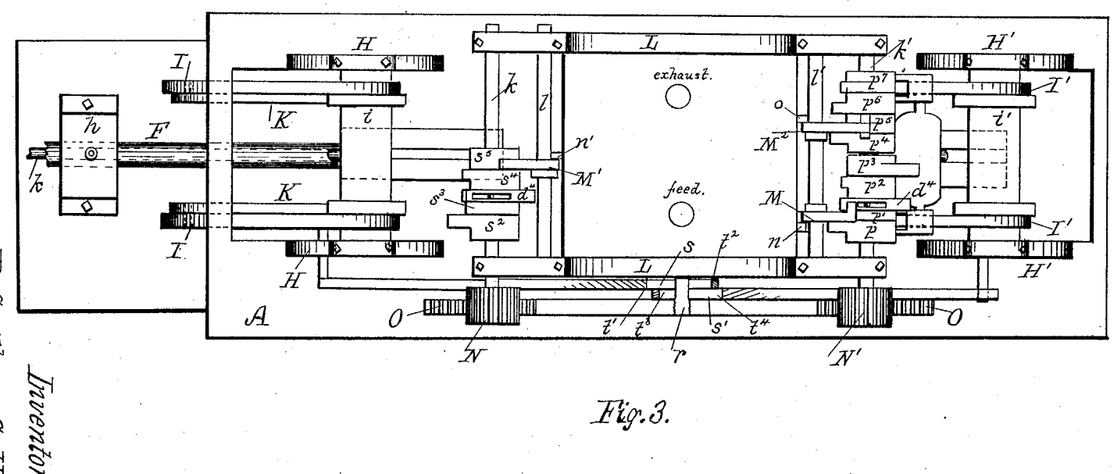
Figures 4, 8, 9, 10, 11, 12, 13, 14:
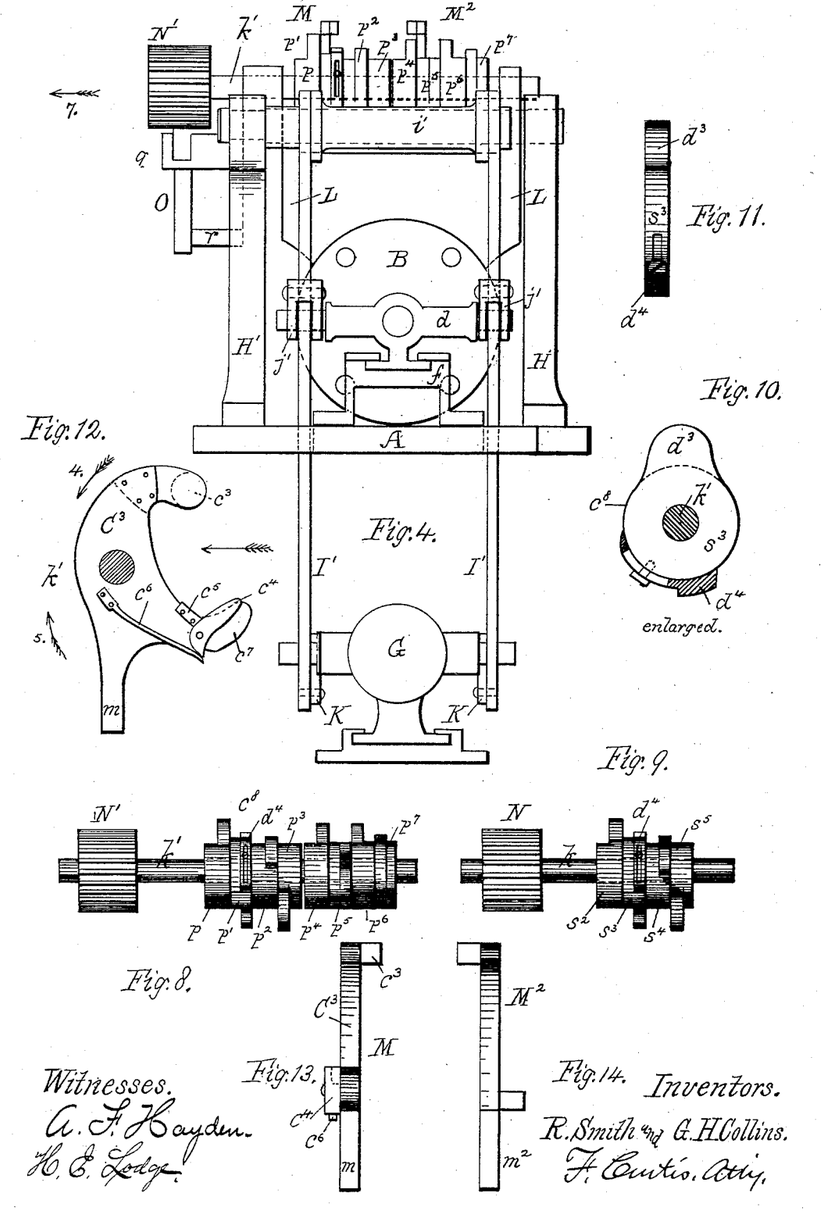

In Fig. 12 is shown a side view of one of the G-shaped levers which operates the active or live-steam valves, and Fig. 13 is a front elevation of the same lever, which is composed of the plate $C^3$, provided with an arm or stud, $c^3$, at the top to engage a certain cam on one side, while a movable piece, $c^4$, is pivoted to said plate on the opposite side at the bottom. This "trip-toe," so called, is constructed to work actively only when its cam is moving in the direction of arrow 5, when the trip-toe is brought to a bearing against the block $c^5$, bolted to the lever $C^3$, and is actuated by the cam, which then engages it. On the other hand, in case the lever is not to be moved, when the cam is operating in the opposite direction it will wipe over the nose of $c^4$, displacing it, against the pressure of the spring $c^6$, which returns and maintains the trip-toe against the fixed block $c^5$ that it ($c^4$) may be in proper position to engage the cam upon its return.

The lower arm, $c^7$, of the lever is used only when the trip-toe is not employed.

The levers above described are the ones marked M M′ in the drawings, and are similarly employed with the double cams $p'$ $s^3$, the latter being shown in Figs. 10 and 11 as provided with two eccentrics—a long one, $d^3$, cast integral with the cams, and a short one, $d^4$, the latter adjustable—in order to effect proper cut-off, as it is by means of this that the valves $A^2$ $A^3$ are moved to close their ports and shut off at proper times the live steam, which can be thus employed expansively or not, as may be desired. It must be understood that the steam is to be used expansively by means of the adjustable plate $d^4$ on the cam and the trip-toe $c^4$ on the lever during the active stroke only and after the blades of the propeller are expanded—that is, when the two pistons are moving bodily or in unison together; hence only one of these double cams and the movable trip-toe with which it co-operates is to be used at the same time, and when the vessel is moving forward the cam $p$ will co-operate with the trip-toe $c^4$ on lever M. On the other hand, when the vessel is going astern, with the engine reversed, the active stroke will commence from the rear end of the cylinder, and the cam $s^2$ will co-operate with the trip-toe $c^4$ on the lever M'.

When the trip-toe $c^4$ on the levers M M' is actively employed, the adjacent lower arm, $c^7$, of its lever is inactive; but when the cam-shaft is shifted laterally, and the trip-toe becomes inactive, the lower arm, $c^7$, then becomes active.

To effect reverse movements of the propeller, either from ahead to astern, or vice versa, the cam-shafts $k$ $k'$ are given a shrug laterally with reference to the levers and their shafts, which are always fixed in their positions. By this means a different set of cams are brought into active operation. For instance, in Fig. 4 the cams and levers are in position for forward propulsion of the vessel, and in order to reverse the engine the shaft $k'$ must be thrust in the direction of arrow 7, which will bring cams $p^7$ $p^8$ with lever M$^2$ for the exhaust, while shaft $k$ is thrust in an opposite direction, and the cams $s^2$ $s^3$ are changed, so as to co-operate with the lever M' in lieu of the cams $s^4$ $s^5$ hitherto actively employed, and which now remain inactive.

The movement of the trip-toe $c^7$ is effected as follows: (See Figs. 8, 15, and 17.) In Fig. 15 cam-shaft $k'$ and cam $p'$ has moved in the direction of its arrow, and its long arm has just engaged the lip $c^3$ of lever M, which has moved the valve A$^3$ and opened port $a^4$, referring to Fig. 17, at the same moment of time the eccentrics of $p$ would stand on the inside of the trip-toe $c^4$, and as the shaft $k'$ revolves and wipes over said trip-toe depressing the latter without changing position of the lever M, and the valve remains stationary. Immediately upon the opening of port $a^4$ by the valve A$^3$ the shaft $k'$ reverses its movement in the direction of the arrow in Fig. 17, and cam $p$, returning, engages the trip-toe $c^7$ and effects a rocking of the lever, and opens the port $a^5$ by sliding the valve A$^3$ in the direction of its arrow. The shaft is again advanced in the same direction until the short adjustable eccentric $d^4$ engages $c^3$ upon the upper end of the lever M, and shuts off live steam, while the position of said piece $d^4$ allows the valve A$^3$ to remain open a longer or shorter time, dependent upon the position of $d^3$ upon the periphery of its cam. During these movements, and while the cam-shaft $k'$ is in the position shown in Fig. 4, the nose $c^7$ remains inactive, since it is in alignment with the small diameter $c^8$ of the cam $p'$. (See Fig. 8 of the drawings.)

We claim—

1. The propeller-shaft and secondary shaft, the former being connected to the hinge of a folding blade or blades, and the secondary shaft being connected to the outer part of said blade or blades, for opening and closing the same, in combination with a steam-cylinder, two pistons moving therein, and devices whereby the rods of said pistons are respectively connected to said propeller-shaft and to said secondary shaft, substantially as and for the purpose set forth.

2. The combination of a steam-cylinder, two pistons reciprocating within the same, the propeller-shaft F, and the secondary shaft $k$, operated, respectively, by said pistons, and valves and their actuating mechanism for controlling the admission and exit of steam, whereby steam is first admitted between the two pistons and retained there to keep the two pistons apart, and while it is thus retained additional steam is admitted behind both pistons to drive them bodily along together, and toward the end of this stroke the steam is exhausted from between the two pistons to allow them to close together before the return-stroke, substantially as set forth.

3. The combination of a main piston and a secondary piston, operating as described, with a cylinder which contains them, and is provided with ports, arranged as described, valves for admitting steam through said ports and allowing its exit, a semi-rotary shaft carrying two sets of cams for operating on these valves, and levers, pinions, and a rack for actuating said shaft, said rack being capable of a thrust or spring due to the movement of the pistons, and one set of cams being used when the vessel is to be driven ahead and the other when it is to be backed, substantially as set forth.

4. In combination with two pistons and the cylinder in which they work, devices for admitting steam between said pistons to move one of them before said pistons make their active stroke together, substantially as set forth.

5. In combination with two pistons and a cylinder in which they both travel, valves and ports whereby, on completion of the active stroke, live steam is admitted between the head of the cylinder and the adjacent piston, and the two pistons are driven back thereby in close proximity to one another, making the return-stroke, substantially as set forth.

6. The combination of a steam-cylinder and two pistons operating therein, with a sliding tubular cross-head, a yoke operating in said cross-head, connecting devices between the pistons and said cross-head and yoke, respectively, and the propeller-shaft and secondary shaft, operating substantially as set forth.

7. The combination of the cams and levers for operating the valves, substantially as stated, with the main steam-cylinder, having ports arranged as described, the pistons reciprocating in said cylinder, the tubular cross-head, the sliding yoke and connecting devices, and the rods F $k$, substantially as set forth.

8. Two pistons and a single cylinder within which they co-operate, in combination with exhaust and supply valves governing the corresponding ports of said cylinder, a series of cams mounted on a semi-rotary shaft, a series of levers mounted on a similar shaft, a rack and pinions whereby said shafts are oscillated, and connecting devices whereby said rack receives the necessary shrugs or thrusts from said pistons, substantially as set forth.

9. A steam-cylinder having the live-steam ports $a^2$, $a^3$, $a^4$, and $a^5$, and the exhaust-ports $b^2$ $b^3$, in combination with two pistons operating in said cylinder, said ports being arranged with respect to said piston substantially as set forth.

In testimony whereof we have affixed our signatures in presence of two witnesses.

RICHARD SMITH.
GEORGE HENRY COLLINS.

Witnesses:
H. E. LODGE,
A. F. HAYDEN.